Inventor
Leonard L. Snyder
By Lyon & Lyon
Attorneys

Patented Apr. 11, 1950

2,503,424

UNITED STATES PATENT OFFICE 2,503,424

BACKFLOW PREVENTER

Leonard L. Snyder, Montebello, Calif.

Application January 15, 1945, Serial No. 572,792

8 Claims. (Cl. 137—144)

1

This invention relates to backflow preventers and more particularly to a backflow preventer adapted to be positioned between a service or induction line and a consumer's or eduction line to prevent backflow from the consumer's line to the service line.

It is an object of this invention to provide a backflow preventer which will operate under heavy flows to reduce the overall pressure drop to a minimum.

Another object of this invention is to provide a backflow preventer wherein the control valve will operate to give a higher pressure drop across the control valve at cessation of normal flow than exists during heavy flow from the service or induction to the consumer's or eduction line.

Another object of this invention is to provide a backflow preventer which includes a relief valve normally held closed by the pressure drop across the control valve, the relief valve being constructed in a manner to reduce the pressure drop necessary to operate the relief valve to or from closed position.

Another object of this invention is to provide a backflow preventer which includes a means for increasing the pressure drop for holding the relief valve closed during the heavy flows previously mentioned, but said pressure drop not being reflected as an overall pressure drop of the unit.

Other objects and advantages of this invention it is believed will be apparent from the following detailed description of a preferred embodiment thereof as illustrated in the accompanying drawing.

Figure 1:
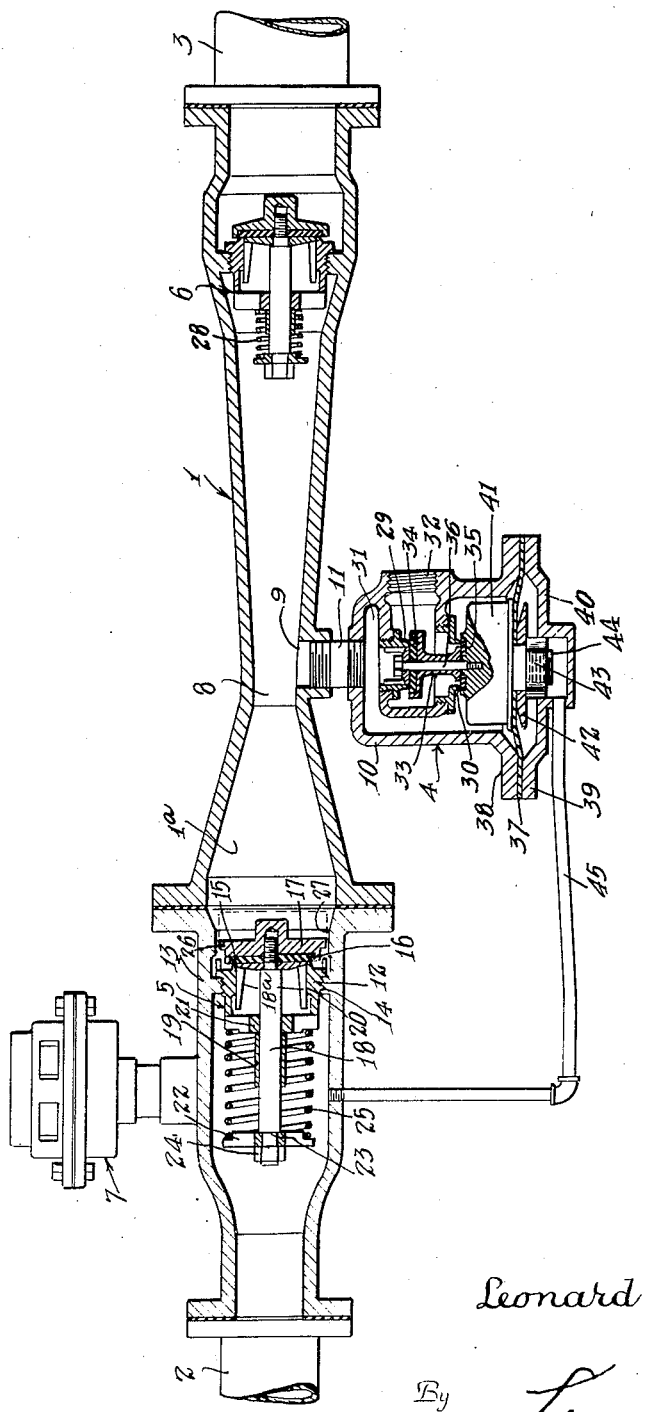
Figure 1 is a sectional side elevation of the backflow preventer embodying my invention.

In a device of this type it is desirable to reduce the overall pressure loss to a minimum, particularly during heavy flows. Referring to Figure 1, 5 is a spring loaded control valve, designed to give a pressure reduction as water flows through it. Part 4 is a differential relief valve operating in conjunction with check valve 6 to produce results hereinafter described. Valve 6 is a check valve located on the eduction side of the relief valve 4, and its purpose is to prevent draining of the consumer's or eduction line under a backflow condition.

The operation of the unit is as follows: during normal flow and at cessation of normal flow, control valve 5 operates to maintain the pressure

2 inside chamber member 1 below the pressure inside chamber member 13. However, in order to reduce this pressure differential under heavy flows, valve head 17 carries an enlarged flanged portion 26, making it possible for the valve to be held open under a heavy flow, with a pressure differential that is less than the pressure differential existing at cessation of flow. This construction, therefore, gives the desired operating characteristics.

As previously stated, relief valve 4 operates in conjunction with control valve 5. Relief valve 4 is held closed by the differential in pressure across control valve 5. For example, the ports may be so designed that if the pressure on the induction side of control valve 5 is six pounds higher than the pressure inside chamber 1, this six pound differential will hold the relief valve closed. However, under a heavy flow condition, flange 26 will act to reduce this differential from six pounds to, say, three pounds per square inch. The differential of three pounds per square inch may be insufficient to positively maintain the relief valve closed in the particular design of the apparatus being described as an example. This is true because the effective weight tending to open the valve requires about two pounds' pressure differential to overcome such opening tendency, and one additional pound per square inch pressure differential has been found by experience to be insufficient to insure an effective seal of the valve head on its seat. The weight is set to require two pounds' pressure differential to offset its opening effect, since experience has also taught that the relief valve should be open when the pressure between the check valves approaches to within two pounds of the induction pressure. Therefore, an additional pressure drop must be obtained in order to insure that the relief valve will remain closed against the action of the weight 41.

This is accomplished by using a Venturi section, which has a restricted throat 8, and connecting the relief valve to this throat by means of pipe fitting 11. Under heavy flows the pressure in throat 8 will be less than the pressure at the inlet of chamber 1, due to the action of the Venturi shaped section. This additional drop while available for holding the relief valve closed is not reflected in the overall pressure drop of the unit.

In Figure 1, I have illustrated the backflow preventer as embodying a chamber member 1 and a chamber member 13, which are adapted to be interposed between a service or induction line 2 and a consumer's or eduction line 3. The direction of normal flow is from the induction line 2 to the eduction line 3. The induction line 2 is connected with any suitable source of water or other fluid under pressure while the consumer's line 3 extends to any desired location for conducting the water or fluid under pressure.

The control valve 5 is of the spring loaded type, which acts as a control valve under normal flows, and as a check valve under a backflow condition. Under the action of spring 25, control valve 5 remains closed until the pressure at the inlet of chamber 13 reaches a value sufficient to cause the valve to open and permit flow therethrough. A valve seat member 12 is threaded into the valve body 13, as indicated at 14. The valve member 12 provides an annular valve seat 15 upon which disc 16 is seated. Disc 16 is clamped to disc holder 17 by means of a guide 18a and a valve stem 18, which is threaded into disc holder 17. A fingered spring retainer 22 is mounted on one end of valve stem 18 and is clamped against shoulder 23 by means of a nut 24. Guide 18a is centered in bore 20 and in valve member 12. Spring 25 is positioned between the retainer and a shoulder on valve seat member 12 in such a manner that valve disc 16 is continually urged against valve seat 15. Valve stem 18 is guided by a journal 21, which is formed in an extension of valve seat member 12 in such a manner that the valve stem 18 and seat 16 are held in alignment. Disc holder 17 carries an annular flange 26, which is slightly smaller than bore 27 in member 13. As flow starts through the control valve the inlet pressure immediately acts upon the total area of flange 26. Therefore, under heavy flows the pressure drop required to hold the valve in wide open position is less than the pressure drop required to start flow through the valve. Sleeve 19, fitting loosely over valve stem 18, is used to limit the travel of the valve stem 18.

Member 1 is formed with a shape to correspond to a Venturi tube with a converging inlet portion, a throat, and a diverging outlet section. The action of this member under heavy flows will be more completely described hereinafter.

The vent, or relief valve 4, is a pressure balanced valve connected to the throat 8 of member 1. It includes a valve body 10, which carries two opposed valve seats 29 and 30 positioned between the fluid passage 31 and the discharge passage 32. The valve head member 33 carries two valve discs 34 and 35 on clamping bolt 36 and are adapted to seat simultaneously against seats 29 and 30. The bores through seats 29 and 30 are equal and the double valve unit, per se is thus of the pressure balance type.

It is apparent that if a balanced type of valve were not used, the force necessary to move the relief valve from closed position would be much greater, and the greater the pressure within the system the greater would be the force required to operate the relief valve. Since the moving force must come from the pressure drop across the control valve, it is obvious that too great a pressure drop would be required where the unit is operating under a pressure close to the maximum allowable. Mounted within the relief valve body 10 is a diaphragm 37 which is clamped between the flange 38 of the body and the flange 39 of the cover plate 40. Diaphragm 37 is clamped to a weighted head 41 by means of a retaining disc 42 and a nut 43, which is threaded on the spindle 44 of the weight 41. Diaphragm 37, through weighted head 41, is operatively attached to valve discs 34 and 35. Weight 41 is included for the purpose of urging the relief valve to an open position at all times. This feature being particularly important during times when the pressure within the system is low, or when a condition of atmospheric or sub-atmospheric pressure exists, in service line 2. Connected to the cover 40 of the valve body 10 is a pressure line 45, which conducts fluid from housing 13 to the underside of diaphragm 37. The pressure on the underside of diaphragm 37 is, therefore, substantially equal to the pressure within housing 13. The pressure within chamber 1 is exerted on the opposite side of diaphragm 37. It is apparent that the area of the diaphragm exposed to the pressure within chamber 1 is equal to the area of the diaphragm exposed to pressure of chamber 13. Since a pressure drop is always maintained across valve 5, it is also apparent that the pressure on the underside of diaphragm 37 will be higher than the pressure on the top side. It can be seen, therefore, that this pressure drop acts to hold the relief valve closed.

A balanced type valve member 33 is employed in order to secure the maximum effective area on which pressure in the chamber 31 acts to open the valve. If an unbalanced valve element were used, the area available to the pressure in the chamber 31 would be equal to the effective area of the diaphragm 37 minus the effective area of the unbalanced valve. The use of the balanced valve member 33 results in making the full effective area of the diaphragm, undiminished and unaffected by the valve area, available to the pressure within the casing 10. Movement of the valve member 33 from one position to the other is therefore controlled solely by the pressure differential across the diaphragm 37, as modified by the weight 41, and is independent of the effective area of the valve.

Since the pressure in fluid passage 31 is the same as the pressure existing at the throat 8 of member 1, and since the pressure within the discharge passage 32 is atmospheric, it is obvious that the pressure of fluid flowing through the system is operating to induce leakage across seats 29 and 30. It is essential, therefore, that the force holding the valve discs 34 and 35 against their respective seats 29 and 30 be of a magnitude sufficient to provide the necessary sealing pressure between said discs and their respective seats. If the pressure drop across control valve 5 reaches too small a figure, the force acting to close the relief valve will be insufficient and there will be continual leakage across valve seats 29 and 30. It is, therefore, obvious that under heavy flows in normal direction, and through the action of the flange 26, control valve 5 might not provide sufficient pressure drop to hold the relief valve closed, unless some other means is used to increase the pressure drop available for holding the relief valve closed. This additional drop is supplied through the action of the throat 8 of the Venturi shaped member 1.

Check valve 6, threaded into the discharge end of the valve member 1, is similar in construction to control valve 5, except that spring 28, which urges the valve to a closed position is much lighter than spring 25 of control valve 5. Very little pressure drop is required to open this check valve. Its purpose, as previously stated, is to prevent draining of the consumer's line 3 under a backflow condition.

The operation of the unit is as follows: Water from service line 2 enters the chamber within housing 13. Due to the action of spring 25, control valve 5 does not open until the pressure within the chamber of housing 13 reaches a predetermined amount, say, six pounds per square inch. However, this pressure is immediately transmitted through pipe 45 to the underside of diaphragm 37, closing relief valve 4 in preparation for normal flow. Control valve 5 starts to open and water passes through into chamber 1a of member 1. If a heavy flow is going through the valve, due to the action of the flanged portion 26, the pressure drop across control valve 5 may then drop to, say, three pounds per square inch and this pressure drop may not be sufficient to hold the relief valve 4 closed, even though water is flowing through the device in normal direction. However, by using the Venturi shaped section the pressure at throat 8 may be approximately three pounds less than the pressure in chamber 1a with the result a pressure drop of six pounds is still available for maintaining the relief valve closed. This increased pressure drop in throat 8 is not reflected as an overall pressure drop since the velocity in throat 8 is returned as pressure head.

Let us now assume that all outlet valves in the consumer's line 3 have been closed and that flow through the valve 5 has ceased. The conditions that exist will be as follows: The pressure within the service line 2 will be, say, sixty pounds per square inch, the pressure within chamber 1a will be fifty-four pounds per square inch, and the pressure within the consumer's pipe system 3 will also be approximately fifty-four pounds per square inch. Now assume that a backflow condition has occurred. This may be due to an increase in pressure in the consumer's line 3 due to a secondary pumping system or the like, or the backflow condition may be caused by a drop in pressure in the service line 2 due to heavy withdrawals from the service supply line. Assume that the first condition exists, that is, the pressure in the consumer's line 3 has risen above the normal shut-off pressure of fifty-four pounds per square inch to a pressure of, say, seventy-five pounds per square inch. If check valve 6 is not leaking, nothing happens. However, if the check valve 6 leaks, the pressure within member 1 will start to rise. When it reaches a pressure of approximately fifty-six pounds per square inch, still four pounds lower than the pressure in service line 2, the relief valve 4 under the action of weight 41 and because of the lack of sufficient sealing force between disc 34, 35 and their respective seats, will not be sufficient to prevent leakage, and the valve will, therefore, open to drain this fluid to atmosphere through the discharge chamber 32. Relief valve 4 will continue to drain as long as this backflow condition exists and as long as check valve 6 is leaking. It is important to emphasize the fact that the relief valve opens to drain this fluid before the pressure within member 1 equals the pressure within the chamber of member 13. This valve, therefore, operates by what I choose to define as an inferior pressure type, and in this respect is similar to a type which is disclosed in the copending application of Frank Carlton, Serial No. 518,516, filed January 17, 1944, for "Method of preventing back-flow or back-siphonage in a pressure system," now Patent No. 2,389,413 dated November 20, 1945.

As indicated in the drawings, there may be positioned in advance of the control valve 5 a vacuum breaker 7, which operates to vent the service line 2 to the atmosphere when a condition of vacuum or sub-atmosphere pressure exists within service line 2. This vacuum breaker 7 may be of any suitable or desirable construction as, for example, as illustrated in my copending application, Serial No. 532,576, filed April 25, 1944, for "Vacuum breaker."

Figure 2:
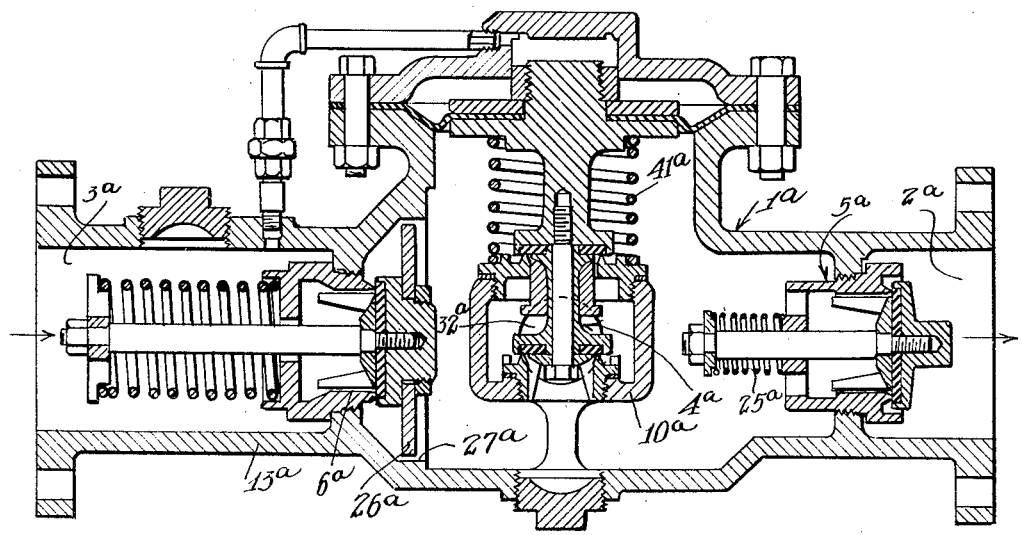
Figure 2 is a sectional elevation of a modified form of backflow preventer embodying my invention.

In the modification of my invention, shown in Fig. 2, I likewise employ a pressure balanced vent or discharge valve 4a but utilize a spring 41a to urge the said discharge valve 4a to its open position in the place of the weight 41. In this modification I also have eliminated the use of the Venturi throat or restriction and do not depend upon or utilize the reduction of pressure thereby accomplished in order to reduce the overall pressure drop through the backflow preventing apparatus. In this case, the valve disc 26a does not operate to cause less pressure drop across the control valve under heavy flows than under no flow. Disc 26a is of such diameter that under heavy flow, the pressure drop across the main valve is approximately the same as under no flow. The pressure drop across the control valve under heavy flows, therefore, is less what it would be if disc 26a were not used, but is still sufficient to hold the relief valve closed. In other respects this modification of my invention is substantially similar to that disclosed in Figure 1 with the possible further exception that the discharge valve 4a is housed within the discharge valve casting 10a integrally cast within the chamber member 1a and discharging through a lateral discharge opening 32a formed through the wall of the housing 1a.

Having fully described my invention, it is to be understood that I do not wish to be limited to the details herein set forth, but my invention is of the full scope of the appended claims.

I claim:

1. In a backflow preventer, a member having an induction line inlet and an eduction line outlet, the member having a chamber establishing communication between said inlet and outlet, a flow control valve interposed between the induction line inlet and said chamber and including means arranged to produce pressure drop in said chamber relative to the pressure in the induction line inlet during flow and at cessation of flow, a relief valve positioned to drain said chamber having an area subjected to chamber pressure tending to effect opening of said valve, pressure actuated motor means having areas subjected to chamber pressure tending to effect opening of said valve and to induction line inlet pressure tending to effect closing of said valve the effective areas of the motor and valve subjected to the chamber pressure being substantially equal to the area on said motor subjected to the induction line inlet pressure, biasing means acting to urge the relief valve to open position, said biasing means operating to open said relief valve when the chamber pressure approaches the induction line inlet pressure within a predetermined amount, the predetermined amount being less than the pressure drop, said relief valve being closed when the induction line inlet pressure exceeds the chamber pressure by an amount greater than said predetermined amount.

2. In a backflow preventer, a member having an induction line inlet and an eduction line outlet, the member having a chamber establishing communication between said inlet and outlet, a flow control valve interposed between the induction line inlet and said chamber and including means arranged to produce pressure drop in said chamber relative to the pressure in the induction line inlet during flow and at cessation of flow, a relief valve and fluid motor assembly so positioned relative to said chamber that said relief valve may be opened to drain said chamber, said assembly having a movable area subjected to chamber pressure and tending to effect opening of said relief valve, said fluid motor having a movable area subjected to induction line inlet pressure tending to effect closing of said relief valve, the said area subjected to chamber pressure being substantially equal to the area on said motor subjected to the induction line inlet pressure, biasing means acting to urge the relief valve to open position, said biasing means operating to open said relief valve when the chamber pressure approaches the induction line inlet pressure within a predetermined amount, the predetermined amount being less than said pressure drop, said relief valve being closed when the induction line inlet pressure exceeds the chamber pressure by an amount greater than said predetermined amount.

3. In a backflow preventer, a member having an induction line inlet and an eduction line outlet, the member having a chamber establishing communication between said inlet and outlet, a flow control valve interposed between the induction line inlet and said chamber and including means arranged to produce pressure drop in said chamber relative to the pressure in the induction line inlet during flow and at cessation of flow, a relief valve positioned to drain said chamber, said valve including a body provided with a pair of axially spaced immovable seats and an axially movable member having axially spaced sealing elements adapted to engage said seats, one of the sealing elements seating with the pressure in the chamber and the other against it, the latter sealing element having an area subjected to chamber pressure tending to effect opening movement of the movable member, pressure actuated motor means having areas subjected to chamber pressure tending to effect opening of said movable valve member and to induction line inlet pressure tending to effect closing of said movable valve member, the effective areas of the motor and valve subjected to the chamber pressure being substantially equal to the area on said motor subjected to the induction line inlet pressure, biasing means acting to urge the movable valve member to open position, said biasing means operating to open said relief valve when the chamber pressure approaches the induction line inlet pressure within a predetermined amount, the predetermined amount being less than the pressure drop, said relief valve being closed when the induction line inlet pressure exceeds the chamber pressure by an amount greater than said predetermined amount.

4. In a backflow preventer, a member having an induction line inlet and an eduction line outlet, the member having a chamber establishing communication between said inlet and outlet, a flow control valve interposed between the induction line inlet and said chamber and including means arranged to produce pressure drop in said chamber relative to the pressure in the induction line inlet during flow and at cessation of flow, a relief valve positioned to drain said chamber, said valve including a body provided with a pair of axially spaced immovable seats and an axially movable member having axially spaced sealing elements of substantially equal area adapted to engage said seats, one of the sealing elements seating with the pressure in the chamber and the other against it, the latter sealing element having an area subjected to chamber pressure tending to effect opening movement of the movable member, pressure actuated motor means having areas subjected to chamber pressure tending to effect opening of said movable valve member and to induction line inlet pressure tending to effect closing of said movable valve member, the effective areas of the motor and valve subjected to the chamber pressure being substantially equal to the area on said motor subjected to the induction line inlet pressure, biasing means acting to urge the movable valve member to open position, said biasing means operating to open said relief valve when the chamber pressure approaches the induction line inlet pressure within a predetermined amount, the predetermined amount being less than the pressure drop, said relief valve being closed at all times when the induction line inlet pressure exceeds the chamber pressure by an amount greater than said predetermined amount.

5. In a backflow preventer, a member having an induction line inlet and an eduction line outlet, the member having a chamber establishing communication between said inlet and outlet, a flow control valve interposed between the induction line inlet and said chamber and including means arranged to produce pressure drop in said chamber relative to the pressure in the induction line inlet during flow and at cessation of flow, a relief valve positioned to drain said chamber, said valve including a body provided with a pair of stationary seats and a pair of movable sealing elements cooperable therewith, said sealing elements being connected for simultaneous dependent movement, one of the sealing elements engaging one of the seats in a direction with the pressure in the chamber, and the other sealing element engaging the other seat in a direction against the pressure in the chamber, the latter sealing element having an area subjected to chamber pressure tending to effect opening of the relief valve, motor means having areas subjected to chamber pressure tending to effect opening of said movable valve member and to induction line inlet pressure tending to effect closing of said movable valve member, the effective areas of the motor and valve subjected to the chamber pressure being substantially equal to the area on said motor subjected to the induction line inlet pressure, biasing means acting to urge the movable valve member to open position, said biasing means operating to open said relief valve when the chamber pressure approaches the induction line inlet pressure within a predetermined amount, the predetermined amount being less than the pressure drop, said relief valve being closed when the induction line inlet pressure exceeds the chamber pressure by an amount greater than said predetermined amount.

6. In a backflow preventer, a member having an induction line inlet and an eduction line outlet, the member having a chamber establishing communication between said inlet and outlet, a flow control valve interposed between the induction line inlet and said chamber and including means arranged to produce a pressure drop in said chamber relative to the pressure in the induction line inlet during flow and at cessation of flow, a Venturi passage in the chamber element for establishing a further pressure drop therein during heavy flow therethrough, a relief valve positioned to drain said Venturi passage, the relief valve having an area subjected to Venturi pressure tending to effect opening of the valve, pressure actuated motor means having areas subjected to Venturi pressure tending to effect opening of said valve and to induction line inlet pressure tending to effect closing of said valve, the effective areas of the motor and valve subjected to the Venturi pressure being substantially equal to the area on said motor subjected to the induction line inlet pressure, biasing means acting to urge the relief valve to open position, said biasing means operating to open said relief valve when the Venturi pressure approaches the induction line inlet pressure within a predetermined amount, the predetermined amount being less than the first said pressure drop, said relief valve being closed when the induction line inlet pressure exceeds the Venturi pressure by an amount greater than said predetermined amount.

7. In a backflow preventer, a member having an induction line inlet and an eduction line outlet, the member having a chamber establishing communication between said inlet and outlet, a flow control valve interposed between the induction line inlet and said chamber and including means arranged to produce a pressure drop in said chamber relative to the pressure in the induction line inlet during flow and at cessation of flow, a Venturi passage in the chamber element for establishing a further pressure drop therein during heavy flow therethrough, a relief valve and fluid motor assembly so positioned relative to said Venturi passage that said relief valve may be opened to drain said Venturi passage, said assembly having a movable area subjected to Venturi pressure and tending to effect opening of said relief valve, said fluid motor having a movable area subjected to induction line inlet pressure tending to effect closing of said valve, the said area subjected to Venturi pressure being substantially equal to the area on said motor subjected to the induction line inlet pressure, biasing means acting to urge the relief valve to open position, said biasing means operating to open said relief valve when the Venturi pressure approaches the induction line inlet pressure within a predetermined amount, the predetermined amount being less than the first said pressure drop, said relief valve being closed when the induction line inlet pressure exceeds the Venturi pressure by an amount greater than said predetermined amount.

8. In a backflow preventer, a member having an induction line inlet and an eduction line outlet, the member having a chamber establishing communication between said inlet and outlet, a flow control valve interposed between the induction line inlet and said chamber and including means arranged to produce a pressure drop in said chamber relative to the pressure in the induction line inlet during flow and at cessation of flow, a Venturi passage in the chamber for establishing a further pressure drop therein during heavy flow therethrough, a relief valve positioned to drain said Venturi passage, said valve having a body provided with a pair of axially spaced immovable seats and an axially movable member having axially spaced sealing elements adapted to engage said seats, one of the sealing elements seating with the Venturi pressure and the other against it, the latter sealing element having an area subjected to Venturi pressure tending to effect opening movement of the movable member, pressure actuated motor means having areas subjected to Venturi pressure tending to effect opening of said movable valve member and to induction line inlet pressure tending to effect closing of said movable valve member, the effective areas of the motor and valve subjected to Venturi pressure being substantially equal to the area on said motor subjected to the induction line inlet pressure, biasing means acting to urge the movable valve member to open position, said biasing means operating to open said relief valve when the Venturi pressure approaches the induction line inlet pressure within a predetermined amount, the predetermined amount being less than the first said pressure drop, said relief valve being closed when the induction line inlet pressure exceeds the Venturi pressure by an amount greater than said predetermined amount.

LEONARD L. SNYDER.

REFERENCES CITED

The following references are of record in the file of this patent:

UNITED STATES PATENTS

| Number | Name | Date |
|---|---|---|
| 1,960,144 | Entriken | May 22, 1934 |
| 1,964,616 | Willson | June 26, 1934 |
| 2,281,283 | Haast | Apr. 28, 1942 |
| 2,328,118 | Ahlport | Aug. 31, 1943 |